United States Patent
Kwak

(10) Patent No.: US 11,294,213 B2
(45) Date of Patent: Apr. 5, 2022

(54) LIQUID CRYSTAL DISPLAY DEVICE

(71) Applicant: LG Display Co., Ltd., Seoul (KR)

(72) Inventor: Byungyil Kwak, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/137,208

(22) Filed: Dec. 29, 2020

(65) Prior Publication Data

US 2021/0199876 A1 Jul. 1, 2021

(30) Foreign Application Priority Data

Dec. 31, 2019 (KR) .......................... 10-2019-0180161

(51) Int. Cl.
*G02F 1/1333* (2006.01)
*F21V 8/00* (2006.01)
*G02F 1/13357* (2006.01)

(52) U.S. Cl.
CPC ..... *G02F 1/133308* (2013.01); *G02B 6/0083* (2013.01); *G02F 1/133314* (2021.01); *G02F 1/133615* (2013.01); *G02B 6/0031* (2013.01); *G02B 6/0055* (2013.01); *G02B 6/0068* (2013.01)

(58) Field of Classification Search
CPC ......... G02F 1/133308; G02F 1/133314; G02F 1/133603; G02F 1/133615; G02B 6/0031; G02B 6/0055; G02B 6/0083
See application file for complete search history.

(56) References Cited

U.S. PATENT DOCUMENTS

2010/0007817 A1* 1/2010 Kim ..................... G02B 6/0083
 349/60
2013/0141667 A1* 6/2013 Son ..................... G02B 6/0085
 349/62

FOREIGN PATENT DOCUMENTS

KR 10-2013 0063258 A 6/2013

* cited by examiner

*Primary Examiner* — Dung T Nguyen
(74) *Attorney, Agent, or Firm* — Polsinelli PC

(57) ABSTRACT

A liquid crystal display device includes a cover bottom including a first bottom surface in a polygonal shape, a first side formed upward from each edge of the first bottom surface, and a first hole formed at the bottom surface, the first side, or the edge; an LED FPCB disposed at an inner surface of the first side; multiple LEDs mounted on the LED FPCB; a reflective plate provided with a second hole formed at a position corresponding to the first hole, the reflective plate being disposed on an upper surface of the first bottom surface; and a cable FPCB provided with a first end extending from one side of the LED FPCB to transmit power or a driving signal from outside, to the LED FPCB, and provided with a second end penetrating through the first hole and the second hole and being disposed outside the cover bottom.

17 Claims, 5 Drawing Sheets

200 : 210 , 220, 230
300 : 310 ~ 340

LIQUID CRYSTAL DISPLAY DEVICE

CROSS-REFERENCE TO RELATED APPLICATION

The present application claims priority to Korean Patent Application No. 10-2019-0180161, filed on Dec. 31, 2019, which is hereby incorporated by reference in its entirety.

BACKGROUND

Field of the Disclosure

The present disclosure relates to a liquid crystal display device.

Description of the Background

A liquid crystal display device (LCD), which is still widely used in a TV, a monitor, and the like because the LCD is advantageous for displaying a dynamic image and has a high contrast ratio, represents the principle of implementing an image by optical anisotropy and polarization of liquid crystals.

In the conventional liquid crystal display device, an LED driving circuit and an LED PCB are electrically connected to each other by soldering a separate flexible cable, and so on. Therefore, the complex assembly tolerance is high and productivity is thus low. In addition, a disconnection defect may occur during use.

In addition, in order to increase light efficiency, a reflective plate reflecting light from an LED is usually placed at the bottom surface of a cover bottom. When the reflective plate is placed at a distance from a light input part (i.e., LED), the total pitch of white uniformity may be remarkably lowered.

In order to prevent this, the rear surface of the reflective plate may be fixed to the bottom surface (or upper surface) of the cover bottom by using an adhesive tape. However, the use of such an adhesive tape may result in an increase in assembly tolerance, an increase in material cost caused by the use of additional components, and occurrence of defective products caused by a decrease in assembly accuracy.

The foregoing is intended merely to aid in the understanding of the background of the present disclosure, and is not intended to mean that the present disclosure falls within the purview of the background art that is already known to those skilled in the art.

SUMMARY

Accordingly, the present disclosure is to provide a liquid crystal display device of which a structure is improved to decrease assembly tolerance, so that productivity is enhanced and assembly accuracy is increased simultaneously.

It is to be understood that technical problems to be solved by the present disclosure are not limited to the aforementioned technical problems and other technical problems which are not mentioned will be apparent from the following description to a person with an ordinary skill in the art to which the present disclosure pertains.

To solve the technical problems, according to some aspects of the present disclosure, there is provided a liquid crystal display device including: a cover bottom including a first bottom surface in a polygonal shape, a first side formed upward from each edge of the first bottom surface, and a first hole formed at the bottom surface, the first side, or the edge; an LED flexible printed circuit board (FPCB) disposed at an inner surface of the at least one first side; multiple light-emitting diodes (LEDs) mounted on the LED FPCB; a reflective plate provided with a second hole formed at a position corresponding to the first hole, the reflective plate being disposed on an upper surface of the first bottom surface; and a cable FPCB provided with a first end extending from one side of the LED FPCB so as to transmit power or a driving signal from outside, to the LED FPCB, and provided with a second end that penetrates through the first hole and the second hole and is disposed outside the cover bottom.

In some aspects of the present disclosure, the liquid crystal display device may further include: a light guide plate disposed on the reflective plate so that a light-incident surface faces the LEDs; at least one optical sheet disposed on the light guide plate; and a liquid crystal panel disposed on the optical sheet.

In some aspects of the present disclosure, the liquid crystal display device may further include a top cover covering edges that an upper surface and side surfaces of the liquid crystal panel define, and fastened to the cover bottom, whereby the top cover and the cover bottom together form an appearance of the liquid crystal display device.

In some aspects of the present disclosure, the liquid crystal display device may further include an LED driving circuit disposed under a rear surface of the cover bottom, and electrically connected to the cable FPCB.

In some aspects of the present disclosure, the reflective plate may include: a second bottom surface reflecting light emitted from the LEDs, to the light guide plate; and a second side formed in a manner that extends from an edge of the second bottom surface, and formed in a manner that has a height corresponding to a partial or whole height of the first side of the cover bottom.

In some aspects of the present disclosure, the reflective plate may be provided with a protruding part that protrudes from an edge of one side of the reflective plate and is provided with the second hole.

The present disclosure includes the cable FPCB that penetrates through the first hole formed in the cover bottom, is integrated with the LED FPCB, and transmits power or a driving signal to the LED FPCB, so that a separate wiring or soldering process is not required, thereby simplifying the assembly process and enhancing durability.

In addition, according to the present disclosure, the second hole is formed at the reflective plate in a manner that corresponds to the first hole so that the cable FPCB is disposed in a penetrating manner. Thus, a separate process for fixing the reflective plate is omitted, so that an assembly process is simplified, and simultaneously, accuracy of placing the reflective plate on the cover bottom may be enhanced.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other features and other advantages of the present disclosure will be more clearly understood from the following detailed description when taken in conjunction with the accompanying drawings, in which.

DETAILED DESCRIPTION

Figure 1:
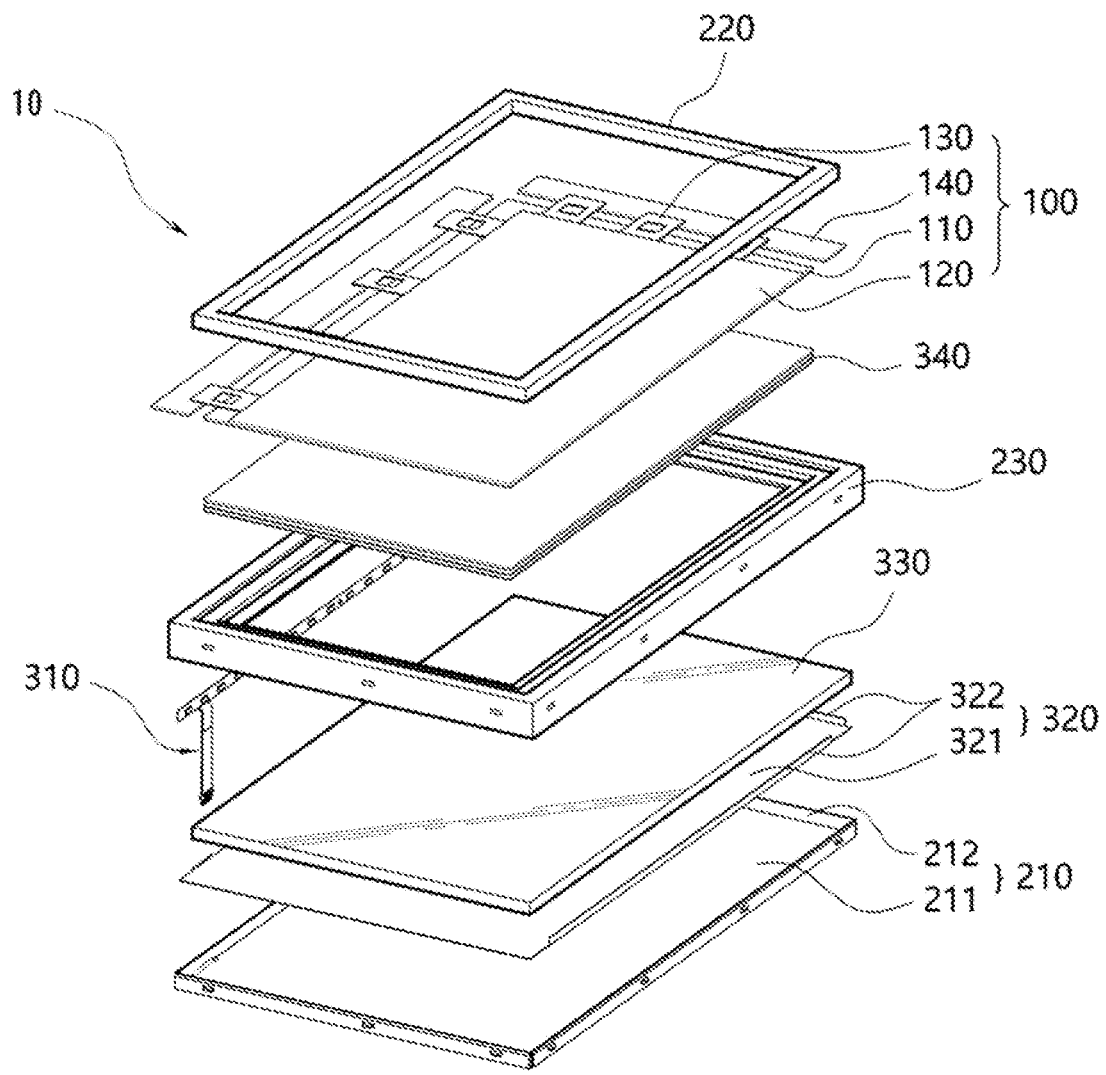
FIG. 1 is an exploded perspective view of a liquid crystal display device according to an aspect of the present disclosure.

Hereinafter, various aspects will be described with reference to the accompanying drawings. In the specification, when an element (area, layer, part, or the like) is referred to as being "on", "coupled to", or "combined with" another element, it may be directly on/coupled to/combined with the other element or an intervening element may be present therebetween.

The same reference numerals refer to same elements. In the drawings, the thicknesses, ratios, and sizes of the elements are exaggerated for effective description of the technical details. The term "and/or" includes one or more combinations that the associated elements may define.

Terms "first", "second", etc. can be used to describe various elements, but the elements are not to be construed as being limited to the terms. The terms are only used to differentiate one element from other elements. For example, the "first" element may be named the "second" element without departing from the scope of the various aspects, and the "second" element may also be similarly named the "first" element. As used herein, the singular forms "a", "an", and "the" are intended to include the plural forms as well, unless the context clearly indicates otherwise.

The terms "under", "below", "on", "above", and the like are used herein for describing relationship between one or more elements shown in the drawings. These terms are relative concepts and are described on the basis of the direction in the drawings.

It is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

Figure 2:
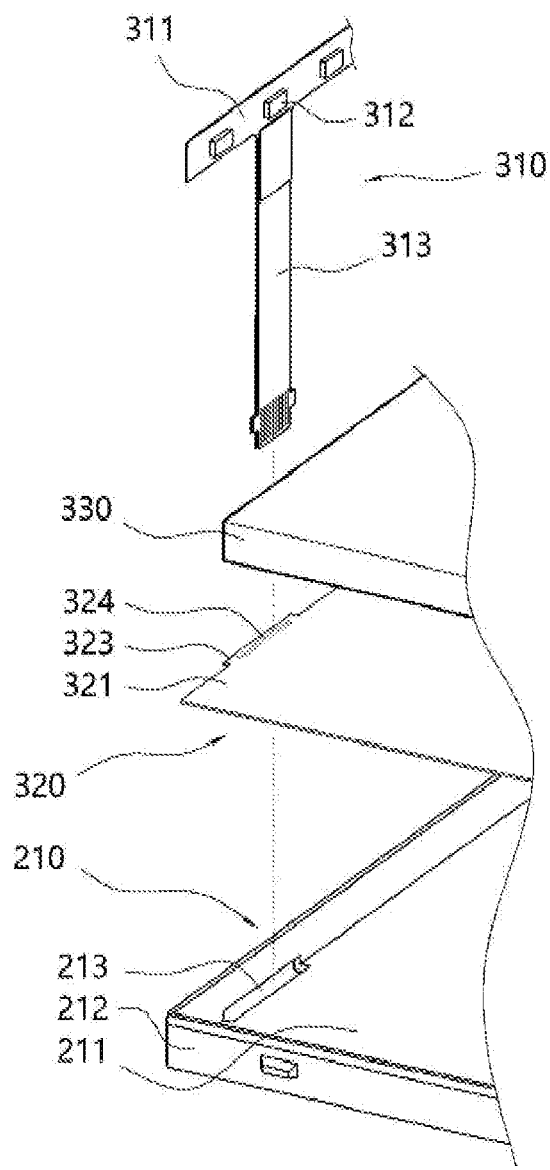
FIG. 2 is a partial enlarged view of a cover bottom, a reflective plate, a light guide plate, and an LED assembly shown in FIG. 1.
Figure 3:
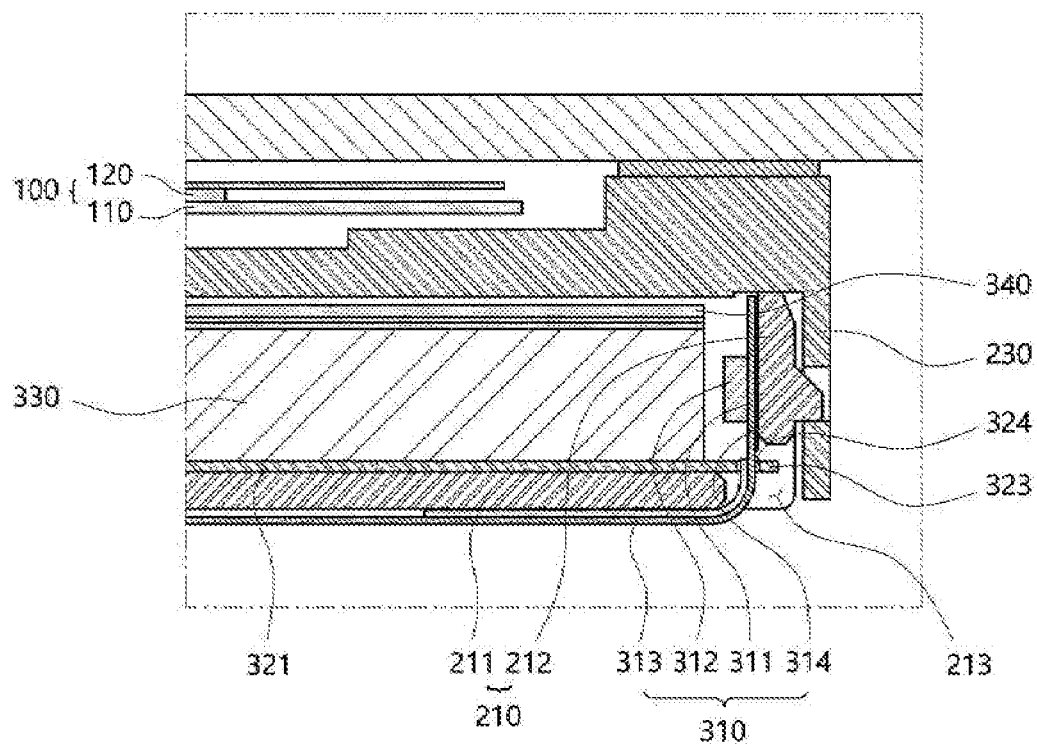
FIG. 3 is a partial cross-sectional view of a liquid crystal display device according to an aspect of the present disclosure.
Figure 4:
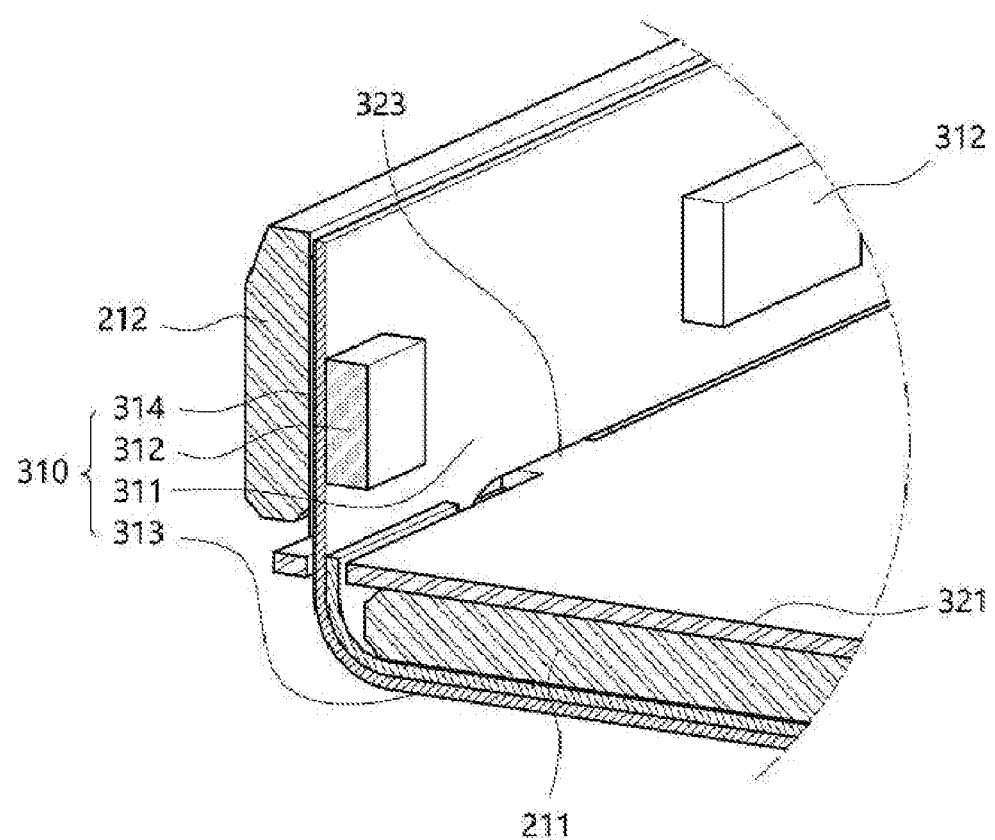
FIG. 4 is a cut-away perspective view of a portion in which a cover bottom, a reflective plate, and an LED assembly are assembled according to an aspect of the present disclosure.
Figure 5:
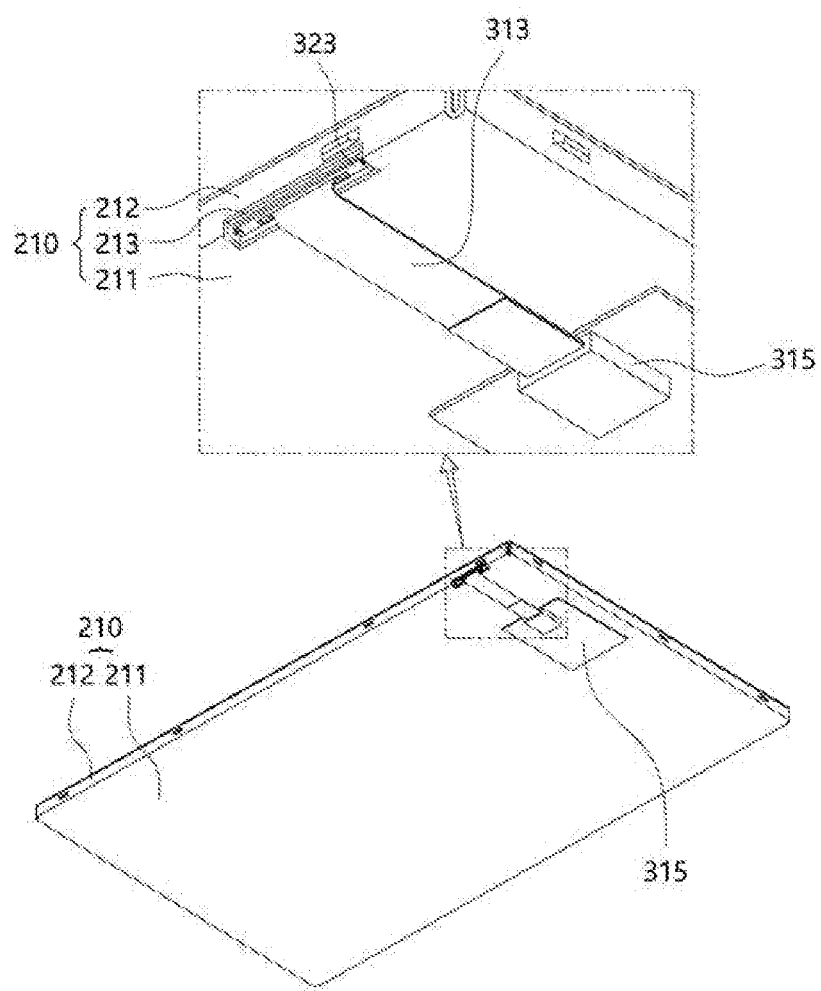
FIG. 5 is a perspective view of a rear surface of FIG. 4.

FIG. 1 is an exploded perspective view of a liquid crystal display device according to an aspect of the present disclosure. FIG. 2 is a partial enlarged view of a cover bottom, a reflective plate, a light guide plate, and an LED assembly shown in FIG. 1. FIG. 3 is a partial cross-sectional view of a liquid crystal display device according to an aspect of the present disclosure. FIG. 4 is a cut-away perspective view of a portion in which a cover bottom, a reflective plate, and an LED assembly are assembled according to an aspect of the present disclosure. FIG. 5 is a perspective view of a rear surface of FIG. 4.

Referring to FIGS. 1 to 5, a liquid crystal display device 10 according to an aspect of the present disclosure may roughly include a liquid crystal panel 100, a cover unit 200, and a backlight unit 300.

The liquid crystal panel 100 is a part handling a main role in displaying an image, and may be placed on an optical sheet 340, which will be described later.

The liquid crystal panel 100 may include a first substrate 110 and a second substrate 120 attached to each other in a facing manner with a liquid crystal layer interposed therebetween.

Herein, assuming an active matrix type, although not shown in the drawings, multiple gate lines and multiple data lines intersect and pixels are defined at the inside of the first substrate 110, which is usually referred to as a lower substrate or array substrate. A thin-film transistor (TFT) is provided at each of the intersecting point, and is connected to a transparent pixel electrode formed at each pixel, in a one-to-one manner.

In addition, at the inside of the second substrate 120 which is also referred to as an upper substrate or color filter substrate, for example, red (R), green (G), and blue (B) color filters, and a black matrix are provided. The color filters correspond to the respective pixels. The black matrix surrounds each of the color filters, and covers non-display elements, such as the gate lines, the data line, the thin-film transistors, and the like. In addition, a transparent common electrode covering these is provided.

Further, polarizing plates (not shown) selectively transmitting only particular light may be attached to outer surfaces of the first substrate 110 and the second substrate 120, respectively.

A printed circuit board 140 is connected to at least an edge of the liquid crystal panel 100 via a connecting member, such as a flexible printed circuit board or a tape carrier package (TCP) 130. The connecting member may be properly bent so that the printed circuit board is brought into close contact with a side surface of the support main 230 or a rear surface of a cover bottom 210 in a modularization process.

Accordingly, in the liquid crystal panel 100, when the thin-film transistor selected for each gate line by an on/off signal of a gate driving circuit is turned on, a signal voltage of a data driving circuit is transmitted to the corresponding pixel electrode through the data line. As a result, by an electric field between the pixel electrode and the common electrode, the arrangement direction of liquid crystal molecules is changed, thereby displaying variances in transmittance.

The cover unit 200 may include a cover bottom 210 and a top cover 220, and may further include a support main 230.

The cover bottom 210 may have a shape in which its upper side is opened.

Specifically, the cover bottom 210 may include: a first bottom surface 211 in a polygonal shape; a first side 212 formed upward from each edge of the first bottom surface 211; and a first hole 213 formed at the bottom surface, the first side 212, or the edge.

That is, as shown in the drawings, the cover bottom 210 may be formed in such a manner that the first bottom surface 211 has a rectangular shape and four first sides 212 are included, but is not limited to this shape.

The top cover 220 covers edges that an upper surface and side surfaces of the liquid crystal panel 100 define, and is fastened to the cover bottom 210, whereby the top cover 220 and the cover bottom 210 together form the appearance of the liquid crystal display device 10.

The support main 230 may be disposed inside the cover bottom 210 and the top cover 220, and may be formed in a frame structure to be put around the edges of the liquid crystal panel 100 and the backlight unit 300 which will be described later.

In the meantime, the cover bottom 210 may also be referred to as a bottom cover or a lower cover. The top cover 220 may also be referred to as a case top or a top case. The support main 230 may also be referred to as a guide panel, a main support, or a mold frame.

The backlight unit 300 is disposed at a rear surface of the liquid crystal panel 100 and supplies light so that the variances in transmittance displayed by the liquid crystal panel 100 are visible from outside. The backlight unit 300 may roughly include an LED assembly 310, a reflective plate 320, a light guide plate 330, and/or an optical sheet 340.

The LED assembly 310 may include an LED flexible printed circuit board (FPCB) 311, a light-emitting diode (LED) 312, and an FPCB 313 for a cable (hereinafter, referred to as a cable FPCB). The LED assembly 310 may further include a metal plate 314, and/or an LED driving circuit 315.

The LED FPCB 311 may be disposed at an inner surface of the cover bottom 210. Specifically, the LED FPCB 311 may be disposed at an inner surface of at least one first side 212. Multiple LEDs 312 may be mounted on the LED FPCB 311.

That is, the LED FPCB 311 is in the shape of a long bar. The multiple LEDs 312 are mounted at regular intervals along the length direction of the LED FPCB 311.

In addition, the LEDs 312 are connected in parallel and receive power through metal wires (not shown) formed on the LED FPCB 311. Herein, the multiple LEDs 312 emit light having red (R), green (G), and blue (B) colors, respectively, to implement white light by color mixing.

In the meantime, a LED configured with a LED chip emitting all the colors of RGB may be used, so that each LED 312 may implement white color light. Alternatively, including a chip emitting white color light, a LED 312 emitting completely white color light may be used.

Herein, the LED FPCB 311 may include a base film having a characteristic of flexibility, and a power wiring layer composed of multiple metal wires (not shown) formed by patterning a conductive material on the base film.

The base film may support the power wiring layer and the multiple LEDs 312 mounted thereon. The base film may be formed in a film form by using resin-based materials that include polyimide, polyester, and the like, or may be formed of a material having the same thermal conductivity as that of flame resistant 4 (FR4) or T-preg.

Herein, multiple metal wires (not shown) of the power wiring layer transmit on/off signals to the multiple LED 312 mounted on the LED FPCB 311. Herein, the multiple metal wires (not shown) are formed not to overlap each other.

In addition, as an organic or inorganic insulating material for protecting the power wiring layer, a cover layer may be formed on the power wiring layer except the portion in which the multiple metal wires (not shown) are formed.

Herein, the cover layer may be composed of a white material capable of reflecting light, and may thus include an insulating function as well as a reflection function.

That is, since the cover layer is formed of a white material having high light reflectance, the cover layer reflect light propagated in an area between the multiple LEDs 312 so that the light enters the light guide plate 330 in the process of light that is emitted from the multiple LEDs 312 and enters the light guide plate 330 which will be described later.

Such a structure may prevent the occurrence of a hot spot defect of that the area between the adjacent LEDs 312 is dark. In addition, such a structure may increase the amount of light entering the light guide plate 330, so that light efficiency may be enhanced.

The cover layer may be formed through a photo solder resist (PSR) process.

In the meantime, the metal plate 314 may be disposed at a rear surface of the LED FPCB 311, specifically, a surface opposite to the surface on which the LEDs 312 are mounted. Herein, the base film serves as an insulation layer between the metal plate 314 and the power wiring layer.

The metal plate 314 may increase the rigidity of the LED FPCB 311 and may enable the heat dissipation design of the LED assembly 310, simultaneously.

That is, the metal plate 314 may be formed of a metal having high thermal conductance such as aluminum (Al), copper (Cu), or the like. The metal plate 314 may enable the high temperature heat generated from the LEDs 312 to be effectively discharged out of the liquid crystal display device 10.

In the meantime, a heat sink (not shown) having an adhesive property and the heat dissipation effect is further provided between the metal plate 314 and the cover bottom 210. Thus, the LED assembly 310 may be attached to the side of the cover bottom 210 while the high temperature heat generated from the LEDs 312 may be rapidly and efficiently discharged to the outside.

The cable FPCB 313 is provided with a first end extending from one side of the LED FPCB 311 so as to transmit power or a driving signal from outside, to the LED FPCB 311. The cable FPCB 313 is provided with a second end that penetrates through the first hole 213 and a second hole 324 and is disposed outside the cover bottom 210.

The cable FPCB 313 may be fixed by the second hole 324, penetrating through the second hole 324. That is, the width and the thickness of the cable FPCB 313 are substantially the same as the horizontal width and the vertical width of the second hole 324, respectively, except a predetermined margin, so that the cable FPCB 313 and the second hole 324 may be strongly engaged with each other. As the end of the cable FPCB 313 engaged as described above is fixed to the cover bottom 210, the reflective plate 320 may also be almost fixed inside the cover bottom 210.

By the LED FPCB 311 engaged with the second hole 324 as described above, the reflective plate 320 may be fixed such that a moving range of the reflective plate 320 inside the cover bottom 210 is reduced to about 1 mm in one among up, down, left, and right directions.

In addition, since the cable FPCB 313 extends from one side of the LED FPCB 311, it may be formed in the same structure as the LED FPCB 311. Therefore, even if bending of the cable FPCB 313 occurs, it is possible to prevent a disconnection defect between the LED FPCB 311 and the LED driving circuit 315 which will be described later.

The LED driving circuit 315 is disposed under a rear surface of the cover bottom 210 and is electrically connected to the cable FPCB 313, so that the LED driving circuit 315 may transmit power and a driving signal.

The reflective plate 320 has a white or silver color. The reflective plate 320 is disposed under a rear surface of the light guide plate 330 which will be described later, and reflects the light passing through the rear surface of the light guide plate 330, toward the liquid crystal panel 100, thereby enhancing the luminance of the light.

The reflective plate 320 according to an aspect of the present disclosure is provided with the second hole 324 on a position corresponding to the first hole 213 of the cover bottom 210, and may be disposed on an upper surface of the first bottom surface 211.

In addition, the reflective plate 320 may be provided with a protruding part 323 that protrudes from an edge of one side of the reflective plate 320 and is provided with the second hole 324. When the reflective plate 320 is disposed on the cover bottom 210, the first hole 213 of the reflective plate 320 is engaged with the protruding part 323 so as to couple the reflective plate 320 and the cover bottom 210.

By such a structure, the cable FPCB 313 penetrates for assembly, so that assembly accuracy is enhanced and a separate fixing member, such as a tape, for the reflective plate 320 is not required, whereby manufacturing time and manufacturing cost are reduced.

In addition, the reflective plate 320 according to an aspect of the present disclosure may include a second bottom surface 321, and a second side 322. The second bottom surface 321 reflects light emitted from the LED 312, to the light guide plate 330. The second side 322 is formed in a manner that extends from an edge of the second bottom surface 321, and is formed in a manner that has a height corresponding to a partial or whole height of the first side 212 of the cover bottom 210.

By such a structure, light may be effectively reflected off to the light guide plate 330 which will be described later, so that enhancement with higher luminance may be achieved, and assembly accuracy of the light guide plate 330 may be enhanced.

The light guide plate 330 may be disposed on the reflective plate 320 so that a light-incident surface of the light guide plate 330 faces the LEDs 312. The light guide plate 330 on which the light emitted from the multiple LEDs 312 is incident serves as a surface light source for the liquid crystal panel 100, because the light entered from the LEDs 312 spreads evenly over a large area of the light guide plate 330 due to several total reflections.

In order to supply uniform light from the surface light source, the light guide plate 330 may include patterns of a particular shape on its rear surface formed by a printing method or injecting method. The patterns may be an elliptical pattern, a polygon pattern, a hologram pattern, and the like so as to guide the light entering the light guide plate 330.

At least one optical sheet 340 may be disposed on the light guide plate 330.

Specifically, the optical sheet 340 includes a diffusion sheet, at least one light-concentrating sheet, and the like. The optical sheet 340 diffuses or concentrates the light passing through the light guide plate 330 so that more uniform light from the surface light source enters the liquid crystal panel 100.

For example, in the liquid crystal display device 10 according to an aspect of the present disclosure, the first hole 213 of the cover bottom 210 and the second hole 324 of the reflective plate 320 face each other, and the second end of the cable FPCB 313 penetrates through the first hole 213 and the second hole 324 and is positioned outside the cover bottom 210, whereby assembly accuracy and assembly speed are enhanced. In addition, a separate fixing member for the reflective plate 320 is not required, so that manufacturing cost may be reduced.

In addition, in the liquid crystal display device 10 according to an aspect of the present disclosure, the second side 322 of the reflective plate 320 reflects light effectively to the light guide plate 330, and simultaneously, assembly accuracy and assembly speed of the light guide plate 330 are enhanced.

It will be understood by those skilled in the art that the present disclosure can be embodied in other specific forms without changing the technical idea or essential characteristics of the present disclosure. Therefore, it should be understood that the aspects described above are illustrative in all aspects and not restrictive. The scope of the present disclosure is characterized by the appended claims rather than the detailed description described above, and it should be construed that all alterations or modifications derived from the meaning and scope of the appended claims and the equivalents thereof fall within the scope of the present disclosure.

What is claimed is:

1. A liquid crystal display device comprising:
   a cover bottom including a first bottom surface with a polygonal shape, a first side formed upward from an edge of the first bottom surface and a first hole formed at the bottom surface and the first side or the edge;
   an LED flexible printed circuit board (FPCB) disposed at an inner surface of the first side; multiple light-emitting diodes (LEDs) mounted on the LED FPCB;
   a reflective plate having a second hole formed at a position corresponding to the first hole and disposed on an upper surface of the first bottom surface; and
   a cable FPCB having a first end extending from one side of the LED FPCB to transmit power or a driving signal from outside, to the LED FPCB, and having a second end that penetrates through the first and second holes and is disposed outside the cover bottom.

2. The liquid crystal display device of claim 1, further comprising:
   a light guide plate disposed on the reflective plate and having a light-incident surface facing the LEDs;
   at least one optical sheet disposed on the light guide plate; and
   a liquid crystal panel disposed on the optical sheet.

3. The liquid crystal display device of claim 2, further comprising a top cover fastened to the cover bottom and covering edges defined by an upper surface and side surfaces of the liquid crystal panel,
   wherein the top cover and the cover bottom form an exterior shape of the liquid crystal display device.

4. The liquid crystal display device of claim 2, wherein the reflective plate comprises:
   a second bottom surface reflecting light emitted from the LEDs, to the light guide plate; and
   a second side formed in a manner that extends from an edge of the second bottom surface, and formed in a manner that has a height corresponding to a partial or whole height of the first side of the cover bottom.

5. The liquid crystal display device of claim 1, further comprising an LED driving circuit disposed under a rear surface of the cover bottom, and electrically connected to the cable FPCB.

6. The liquid crystal display device of claim 1, wherein the reflective plate has a protruding part that protrudes from an edge of one side of the reflective plate and includes the second hole.

7. The liquid crystal display device of claim 1, wherein the second end of the cable FPCB penetrating through the second hole is fixed to an outer surface of the cover bottom, and
   wherein the reflective plate is coupled to the cable FPCB and is fixed inside the cover bottom.

8. The liquid crystal display device of claim 7, wherein the reflective plate is movable by 1 mm or less in one among up, down, left, and right directions, and is disposed inside the cover bottom.

9. The liquid crystal display device of claim 1, wherein the reflective plate has a protruding part that protrudes from an edge of one side of the reflective plate and is engaged with the first hole.

10. A liquid crystal display device comprising:
a cover bottom having a first bottom surface and a first side upwardly extended from an edge of the first bottom surface having a first hole;
an LED flexible printed circuit board (FPCB) disposed at an inner surface of the first side;
a reflective plate disposed inside the cover bottom and an upper surface of the first bottom surface of the cover bottom and having a second hole facing the first hole;
wherein the reflective plate having a protruding part that protrudes from a side edge and coupled with the cover bottom by engaging the protrusion part with the first hole; and
a cable FPCB having a first end that extends from one side of the cable FPCB and transmits power or a driving signal from outside to the LED FPCB, and having a second end that penetrates through the first and second holes and is disposed outside the cover bottom.

11. The liquid crystal display device of claim 10, further comprising:
a light guide plate disposed on the reflective plate and having a light-incident surface facing the LEDs;
at least one optical sheet disposed on the light guide plate; and
a liquid crystal panel disposed on the optical sheet.

12. The liquid crystal display device of claim 11, further comprising a top cover fastened to the cover bottom and covering edges defined by an upper surface and side surfaces of the liquid crystal panel,
wherein the top cover and the cover bottom form an exterior shape of the liquid crystal display device.

13. The liquid crystal display device of claim 11, wherein the reflective plate comprises:
a second bottom surface reflecting light emitted from the LEDs, to the light guide plate; and
a second side formed in a manner that extends from an edge of the second bottom surface, and formed in a manner that has a height corresponding to a partial or whole height of the first side of the cover bottom.

14. The liquid crystal display device of claim 10, further comprising an LED driving circuit disposed under a rear surface of the cover bottom, and electrically connected to the cable FPCB.

15. The liquid crystal display device of claim 10, wherein the reflective plate has a protruding part that protrudes from an edge of one side of the reflective plate and includes the second hole.

16. The liquid crystal display device of claim 10, wherein the second end of the cable FPCB penetrating through the second hole is fixed to an outer surface of the cover bottom, and
wherein the reflective plate is coupled to the cable FPCB and is fixed inside the cover bottom.

17. The liquid crystal display device of claim 16, wherein the reflective plate is movable by 1 mm or less in one among up, down, left, and right directions.

* * * * *